United States Patent
Panchalingam et al.

(10) Patent No.: US 10,655,232 B2
(45) Date of Patent: May 19, 2020

(54) ADDITIVES TO CONTROL HYDROGEN SULFIDE RELEASE OF SULFUR CONTAINING AND/OR PHOSPHORUS CONTAINING CORROSION INHIBITORS

(71) Applicant: Baker Hughes, a GE company, LLC, Houston, TX (US)

(72) Inventors: Vaithilingam Panchalingam, Friendswood, TX (US); Bradley G. Harrell, Pearland, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 190 days.

(21) Appl. No.: 15/870,297

(22) Filed: Jan. 12, 2018

(65) Prior Publication Data

US 2018/0135189 A1    May 17, 2018

Related U.S. Application Data

(63) Continuation-in-part of application No. 14/476,438, filed on Sep. 3, 2014, now abandoned.

(51) Int. Cl.
| C23F 11/167 | (2006.01) |
| C23F 11/14 | (2006.01) |
| C23F 11/10 | (2006.01) |
| C09K 8/54 | (2006.01) |
| E21B 41/02 | (2006.01) |

(52) U.S. Cl.
CPC ............ *C23F 11/1673* (2013.01); *C09K 8/54* (2013.01); *C23F 11/10* (2013.01); *C23F 11/141* (2013.01); *C23F 11/149* (2013.01); *C09K 2208/20* (2013.01); *C09K 2208/32* (2013.01); *E21B 41/02* (2013.01)

(58) Field of Classification Search
None
See application file for complete search history.

(56) References Cited

U.S. PATENT DOCUMENTS

| 3,909,447 | A | 9/1975 | Redmore et al. |
| 4,024,049 | A | 5/1977 | Shell et al. |
| 4,042,323 | A | 8/1977 | Redmore et al. |
| 4,075,291 | A | 2/1978 | Redmore et al. |
| 4,500,445 | A | 2/1985 | French et al. |
| 4,542,253 | A | 9/1985 | Kaplan et al. |
| 5,292,428 | A | 3/1994 | Harrison et al. |
| 5,552,085 | A | 9/1996 | Babaian-Kibala |
| 5,753,596 | A | 5/1998 | Martin et al. |
| 5,863,415 | A | 1/1999 | Zetlmeisl et al. |
| 6,663,841 | B2* | 12/2003 | Salma ............... B01D 53/1481 252/182.11 |
| 8,663,457 | B2 | 3/2014 | Kaplan et al. |
| 2002/0157989 | A1 | 10/2002 | Gatlin et al. |
| 2007/0119747 | A1* | 5/2007 | Harrell ................ C07F 9/1651 208/47 |

FOREIGN PATENT DOCUMENTS

| EP | 0877647 A2 | 11/1998 |
| EP | 2193179 A2 | 6/2010 |
| WO | 2010023628 A1 | 3/2010 |
| WO | 2013181056 A1 | 12/2013 |

* cited by examiner

*Primary Examiner* — Clare M Perrin
(74) *Attorney, Agent, or Firm* — Mossman, Kumar & Tyler, P.C.

(57) ABSTRACT

An additive, such as an aminal, a dibutylamine, or combinations thereof, may treat a system having a corrosion inhibitor in the form of at least one sulfur species and/or at least one phosphorous-containing compound. The additive may be introduced or added to the corrosion inhibitor within an aqueous system, an aerobic system, and/or an anaerobic system to inactivate the sulfur species and/or the phosphorous-containing compounds.

15 Claims, No Drawings

ADDITIVES TO CONTROL HYDROGEN SULFIDE RELEASE OF SULFUR CONTAINING AND/OR PHOSPHORUS CONTAINING CORROSION INHIBITORS

CROSS-REFERENCE TO RELATED APPLICATION

This application is a continuation-in-part application of U.S. patent application Ser. No. 14/476,438 filed Sep. 3, 2014.

TECHNICAL FIELD

The present invention relates to inactivating at least one sulfur-containing and/or at least one phosphorous-containing corrosion inhibitors in a system by introducing at least one additive, such as an aminal, a dialkylamine, and combinations thereof, to the corrosion inhibitor within the system to control or reduce the release of hydrogen sulfide.

BACKGROUND

One of the most difficult problems in the field of corrosion inhibition is that of preventing and/or inhibiting corrosion in oxygenated aqueous systems, such as in water floods, cooling towers, drilling muds, air drilling, auto radiator systems, etc. Many corrosion inhibitors capable of performing in non-aqueous systems and/or non-oxygenated systems perform poorly in aqueous and/or oxygenated systems (i.e. aerobic systems).

Pyrophosphates are one non-limiting example of a type of corrosion inhibitor used as corrosion inhibitors in oxygenated systems. Ethoxylated fatty alcohol may react with phosphorous pentasulfide to form O,O-disubstituted dithiophosphoric acid and pyrophosphates as described in U.S. Pat. No. 4,075,291, which is herein incorporated by reference in its entirety. The '291 patent sets forth the following reactions for obtaining the pyrophosphate products:

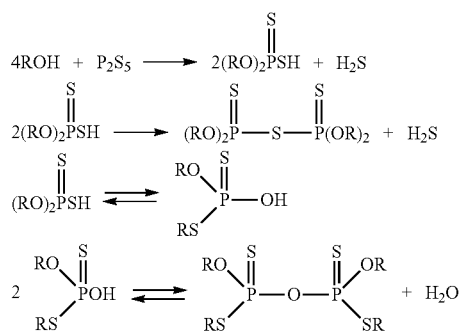

The O,O-disubstituted dithiophosphoric acid initially formed may proceed through an anhydride formation and/or an isomerization to yield the pyrophosphates as shown in the above reactions. The final reaction yields about 40% O,O-disubstituted dithiophosphoric acid as a final product and 60% pyrophosphates and anhydride products. Even though much of the hydrogen sulfide is removed from the initial reaction products, hydrogen sulfide may still form from the anhydride formation and/or isomerization of the O,O-disubstituted dithiophosphoric acid reaction, even after storage and handling of the resulting product. Thus, hydrogen sulfide may be released into the environment upon usage of the pyrophosphates.

After removing hydrogen sulfide from the initial reaction, hydrogen sulfide may be produced form the labile P—S—H linkage in the O,O-disubstituted dithiophosphoric acid. The water formed from the pyrophosphate reaction and/or moisture in the storage container, under normal handling conditions, may react with O,O-disubstituted dithiophosphoric acid to form additional hydrogen sulfide. This additional hydrogen sulfide tends to accumulate in the headspace of a storage container and has been difficult to remove prior to using the product (e.g. pyrophosphates). Since water will react with O,O-disubstituted dithiophosphoric acid and pyrophosphates to release more $H_2S$, any mitigation efforts should involve non-aqueous additives. As such, traditional $H_2S$ scavengers like triazines containing water cannot be used for this application.

It would be desirable if alternative corrosion inhibitors were devised that do not react with other components within a current system and/or are less toxic to the environment and less corrosive.

SUMMARY

There is provided, in one form, a system having at least one phosphorous-containing compound and at least one additive. The phosphorous-containing compound may be or include O,O-disubstituted dithiophosphoric acid, pyrophosphates, and combinations thereof. The additive may be or may include an aminal, a dialkylamine, and combinations thereof. The system may be or include an aqueous system, an aerobic system, an anaerobic system, and combinations thereof.

In an alternative embodiment of the system, the system may further include at least one sulfur species and may have at least one inactivated composition, such as at least one inactivated sulfur species, at least one inactivated phosphorous-containing compounds, and combinations thereof.

In another form, there is provided a method comprising introducing at least one additive to a corrosion inhibitor in a system, wherein the corrosion inhibitor comprises at least one phosphorous-containing compound, such as O,O-disubstituted dithiophosphoric acid, pyrophosphates, and combinations thereof. The additive may be or include an aminal, a dialkylamine, and combinations thereof. The system may be or include an aqueous system, an aerobic system, an anaerobic system, and combinations thereof.

In an alternative form of the method, the corrosion inhibitor may also include at least one sulfur species. The method may further include inactivating the phosphorous-containing compound(s), the sulfur specie(s), and combinations thereof.

The additive compounds are devised to react with the phosphorous containing compounds and the sulfur species and produce stable products within the corrosion inhibitor formulation. In addition, the additive may also inactivate the H2S already formed before the inactivation of the sulfur-containing or phosphorous-containing corrosion inhibitor.

DETAILED DESCRIPTION

It has been discovered that the amount of hydrogen sulfide in a head-space of a container having pyrophosphates may increase during storage even after extended nitrogen purging of the container to remove excess hydrogen sulfide. An additive may be introduced to the places within a system that contain a phosphorous-containing and/or sulfur-containing corrosion inhibitor, such as the container or the headspace of the container in a few illustrative non-limiting embodiments, to inactivate inactivate at least a portion of the sulfur specie(s) and/or the phosphorous-containing compound(s) so that it no longer releases $H_2S$.

Inactivate is defined herein to mean that the sulfur species and/or phosphorous-containing compounds may be chemically altered to no longer chemically react with other components in the current system to release $H_2S$. The inactivated sulfur species and/or inactivated phosphorous-containing compounds are stable products. Moreover, it is not necessary for the sulfur species and/or phosphorous containing compounds to be entirely inactivated for the methods, the additives, and/or treated systems to be considered effective, although complete inactivation is a desirable goal. Success is obtained if more of the sulfur species and/or phosphorous-containing compounds are inactivated by adding or circulating the additive into the system than in the absence of the additive. Alternatively, the methods described are considered successful if a majority of the sulfur species and/or phosphorous-containing compounds within the current system are inactivated. 'Majority' is defined herein to be an amount greater than about 50% of the sulfur species and/or the phosphorous-containing species within the current system.

A first additive may be or include, but is not limited to, an aminal, or a dialkylamine. Two or more additives may be circulated in formulating the corrosion inhibitor at the same time or at different times. The additives do not need to be added or circulated at the same time in formulating the corrosion inhibitor to be considered effective (but, it is preferred). In a non-limiting embodiment, dialkylamine, dialkylamine—O—O-disubstituted dithiophosphoric acid salt, thioformaldehyde, and combinations thereof may be produced within the system as a product of a reaction to inactivate the sulfur species and/or phosphorous-containing compounds. The dialkylamine may have or include alkyl group that are straight or branched chain, and each alkyl group may have from 1 carbon to about 5 carbons, or from about 2 carbons to about 4 carbons.

The aminal may be a linear aminal, or a cyclic aminal, such as but not limited to tetrahydropyrimidine, hexahydropyrimidine, pyrophosphates, and combinations thereof. In a non-limiting embodiment, the cyclic aminal may be 5-tetrahydropyrimidine (5-THP) or another cyclic aminal that is formed by reacting a carbonyl compound (ketone or aldehyde) with ammonia, such as those described in U.S. Pat. No. 3,904,624, which is herein incorporated by reference in its entirety. A non-limiting example of the hexahydropyrimidine may be or include 2,2,4,4-dipentamethylene-5,6-tetramethylene hexahydropyrimidine, such as that described by U.S. Pat. No. 3,936,279, which is herein incorporated by reference in its entirety.

In addition to the cyclic aminal or other type of aminal, or in the alternative, the aminal may be or include, but is not limited to, the aminal may be or include (R1)(R2)N—$CH_2$—N(R3)(R4). R1-R4 may be an alkyl group, an aryl group, a substituted aryl group, an alkylalkoxylate, and combinations thereof in a non-limiting embodiment, and R1, R2, R3, and R4 may be the same or different. In a non-limiting example, the alkyl group may have from 1 carbon to 5 carbons, or from 2 carbons to 4 carbons, and the alkyl group may be a straight chain or a branched chain. Alternatively, R1-R4 of the aminal may be or include at least one butyl group; R1-R4 may be all butyl groups (e.g. $(Bu)_2N$—$CH_2$—$N(Bu)_2$), or only one R group of R1-R4 may be a butyl group.

Non-limiting combinations of the additives may be or include $(Bu)_2N$—$CH_2$—$N(Bu)_2$, and dibutylamine, and combinations thereof; maleic anhydride and dibutylamine; maleic anhydride and $(Bu)_2N$—$CH_2$—$N(Bu)_2$, etc. Moreover, 'first' and 'second' with respect to the additives are used as descriptors to distinguish between the additives circulated within system; additives noted as 'first' or 'second' additives do not necessarily need to be circulated in the system in a particular order.

The system may have or include an increased amount of at least one inactivated sulfur species and/or inactivated phosphorous-containing corrosion inhibitor as compared to an otherwise identical system absent the additive(s). In another non-limiting embodiment, the phosphorous-containing compound may be or include O,O-disubstituted dithiophosphoric acid, pyrophosphates, and combinations thereof.

The system may be an aqueous system, an aerobic system (an oxygenated system), an anaerobic system, and combinations thereof. In a non-limiting embodiment, the aerobic system may be or include a water flood, a water-based or brine-based fluid for drilling or exploration, a cooling tower, air drilling, an auto radiator system, and combinations thereof. Non-limiting examples of the water-based or brine-based fluid may be or include drilling fluids, completion fluids, stimulation fluids, servicing fluids, and combinations thereof.

Drilling fluids are typically classified according to their base fluid. In water-based fluids, solid particles are suspended in a continuous phase consisting of water or brine. Oil can be emulsified in the water which is the continuous phase. "Aqueous-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is brine.

Completion fluids may be placed in a well to facilitate final operations prior to initiation of production. Completion fluids are typically brines, such as chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof.

Chemical compatibility of the completion fluid with the reservoir formation and fluids is key. Chemical additives, such as polymers and surfactants are known in the art for being introduced to the brines used in well servicing fluids for various reasons that include, but are not limited to, increasing viscosity, and increasing the density of the brine. Water-thickening polymers serve to increase the viscosity of the brines and thus retard the migration of the brines into the formation and lift drilled solids from the well-bore. Completion fluids also help place certain completion-related equipment, such as gravel packs, without damaging the producing subterranean formation zones. Conventional drilling fluids are rarely suitable for completion operations due to their solids content, pH, and ionic composition.

Servicing fluids, such as remediation fluids, workover fluids, and the like, have several functions and characteristics necessary for repairing a damaged well. Such fluids may be used for breaking emulsions already formed and for removing formation damage that may have occurred during the drilling, completion and/or production operations. The terms "remedial operations" and "remediate" are defined herein to include a lowering of the viscosity of gel damage and/or the partial or complete removal of damage of any type from a subterranean formation. Similarly, the term "remediation fluid" is defined herein to include any fluid that may be useful in remedial operations.

Before performing remedial operations, the production of the well must be stopped, as well as the pressure of the reservoir contained. To do this, any tubing-casing packers may be unseated, and then servicing fluids are run down the tubing-casing annulus and up the tubing string. These servicing fluids aid in balancing the pressure of the reservoir and prevent the influx of any reservoir fluids. The tubing may be removed from the well once the well pressure is under control.

In a non-limiting embodiment, a first reaction may occur between a first additive and at least one sulfur species to form a first reaction product. A second reaction may occur between the first reaction product and a phosphorous containing compound to form a stable second reaction product. The stable second reaction product may not further react within the system. In a non-limiting example of the first reaction and the second reaction, $(Bu)_2N$—$CH_2$—$N(Bu)_2$ may be circulated within the sulfur-phosphorous containing corrosion inhibitor and react with any hydrogen sulfide present within the current inhibitor. The first reaction products of this 'first reaction' may be thioformaldehyde and dibutylamine. The dibutylamine may react with O, O-disubstituted dithiophosphoric acid in a second reaction to produce a stable phosphorous-containing salt, which does not further release hydrogen sulfide, or does not further react within the current system. The phosphorous-containing salt is the 'second reaction product' for purposes of this example. 'Current system' is defined as a system having components therein at the time the additive(s) are circulated.

Reactants 'A' and 'E' may form the product 'stable salt' where 'stable salt' is the stable phosphorous-containing salt according to the following reaction:

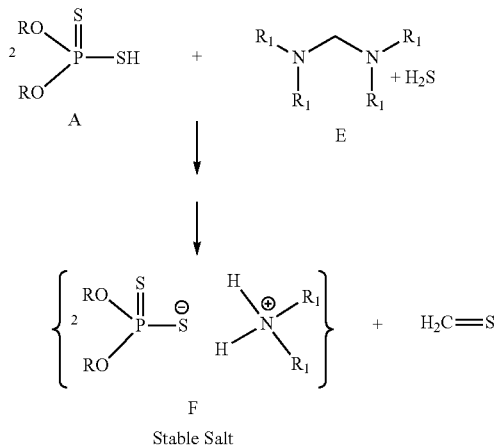

Stable Salt where: R as denoted in compound 'A' and compound 'F' may be or include $CH_3(CH_2)_m(OCH_2CH_2)_n$—, where m ranges from 5 to 9, and n ranges from 2 to 4, or more preferably; alternatively, m ranges from 7 to 9, and n ranges from 3 to 4. $H_2S$ may react with product 'E' to form the cation of the stable salt and $H_2C$=$S$. In a non-limiting embodiment, the $H_2S$ may react with product 'E' at the $CH_2$ position between the two nitrogens in a non-limiting embodiment.

As used herein, 'first reaction', 'first reaction product', 'second reaction', and 'second reaction product' are used to distinguish between the two types of reactions and their corresponding reaction products. In some instances, the reactions will proceed in a sequential manner, such as that noted above. In another non-limiting instance, dialkylamine (e.g. dibutylamine) and $(R1)_2N$—$CH_2$—$N(R1)_2$ [e.g. $(Bu)_2N$—$CH_2$—$N(Bu)_2$] may be added and circulated in the corrosion inhibitor formulation. Thus, the 'second reaction', i.e. where the dibutylamine targets the O, O disubstituted dithiophosphoric acid, may occur in the absence of the 'first reaction'.

In a non-limiting embodiment, an amount of the $(R_1)_2N$—$CH_2$—$N(R_1)_2$ [e.g. $(Bu)_2N$—$CH_2$—$N(Bu)_2$] to be reacted with the O,O-disubstituted dithiophosphoric acid may be calculated by using the formula:

$$X=(0.0019)(\text{acid number})(Y)$$

where X is the amount of $(R_1)_2N$—$CH_2$—$N(R_1)_2$ [e.g. $(Bu)_2N$—$CH_2$—$N(Bu)_2$] in grams and where Y is the amount of the O,O-disubstituted dithiophosphoric acid in grams. The $(R_1)_2N$—$CH_2$—$N(R_1)_2$ [e.g. $(Bu)_2N$—$CH_2$—$N(Bu)_2$] may target both the sulfur species and the phosphorous-containing compound, if both are present in a current system.

The mole ratio of $(R_1)_2N$—$CH_2$—$N(R_1)_2$ [e.g. $(Bu)_2N$—$CH_2$—$N(Bu)_2$] to the O,O-disubstituted dithiophosphoric acid may range from about 0.1:1 independently to about 0.5:1, or alternatively from about 0.3:1 independently to about 1:2. The mole ratio of $(R_1)_2N$—$CH_2$—$N(R_1)_2$ [e.g. $(Bu)_2N$—$CH_2$—$N(Bu)_2$] to the hydrogen sulfide may range from about 1:1 to about 2:1, or from about 2:1 independently to about 0.33:1 in a non-limiting embodiment. The acid number for the $(R_1)_2N$—$CH_2$—$N(R_1)_2$ [e.g. $(Bu)_2N$—$CH_2$—$N(Bu)_2$] treated product may range from about 40 independently to about 20, or from about 30 independently to about 1 in a non-limiting embodiment. The method may include circulating the additive in the corrosion inhibitor formulation and inactivating the sulfur specie(s) and/or the phosphorous-containing compounds within the system.

The effective amount of additive within the system may vary depending on the local conditions and the particular system being treated. The amount of the additive to be added may range from about 1 wt % independently to about 15 wt % based on the total amount of fluid in the system, alternatively from about 5 wt % independently to about 12 wt %, or from about 8 wt % independently to about 10 wt % in another non-limiting embodiment. As used herein with respect to a range, "independently" means that any threshold may be used together with another threshold to give a suitable alternative range, e.g. about 1 wt % independently to about 5 wt % is also considered a suitable alternative range.

The temperature and other characteristics of the system may have a bearing on the amount of the additive to be added thereto. The temperature of the system may range from about 0° C. independently to about 400° C., or from about 30° C. independently to about 300° C. in another non-limiting embodiment, or from about 50° C. independently to about 205° C.

The invention will be further described with respect to the following Examples, which are not meant to limit the invention, but rather to further illustrate the various embodiments.

Example 1

The release of hydrogen sulfide from the headspace of a system was eliminated by adding an additive to the system where the system included O,O-disubstituted dithiophosphoric acid, pyrophosphates, and the like, and an acid number was 64 mg KOH/g of product. $(R_1)_2N$—$CH_2$—$N(R_1)_2$ [i.e. $(Bu)_2N$—$CH_2$—$N(Bu)_2$] was added to the system in an amount of 34 g per 209 g of O,O-disubstituted dithiophosphate and a pyrophosphates-containing corrosion inhibitor. The compound eliminated the hydrogen sulfide in the headspace, which had a volume of about 30% of the total volume of the container. 'Head-space' is defined herein as the unfilled space above the contents within a closed container. The additive may also react with O,O-disubstituted dithiophosphoric acid to form a phosphorous-containing stable salt. One mole of the additive reacted with two moles of O,O-disubstituted dithiophosphoric acid to form the stable salt. In addition, one mole of the additive inactivated one mole of hydrogen sulfide within the current system. 'Stable' is defined herein to mean that the salt or reaction product does not further react within the current system, i.e. no additional hydrogen sulfide or other byproducts are generated from the stable salt or stable reaction product within the current system.

Example 2

A $C_8$-$C_{10}$ fatty alcohol reacted with 3-4 moles of ethylene oxide (576 g: 2 mol) and was stirred at a temperature between about 25° C. to about 40° C., while $P_2S_5$ (111 g; 0.5 mol) was added over a period of 2 hours. The reaction was heated to a temperature between about 105° C. and 109° C. at a pressure of about 70 mmHg for about 9.5 hrs. Upon cooling the system, 657 g was obtained as a pale yellow liquid. The acid number was about 35 mg KOH/g for the product. This corresponds to a mixture of about 40% O,O-disubstituted dithiophosphoric acid and 60% of anhydrides and pyrophosphates. To 330 g of this product, 49 g of an aminal reaction product derived from 2 mol of dibutylamine and 1 mol of formaldehyde was added at 30° C. over a 0.5 hr period. The resulting system was sampled at regular time intervals with a Drager tube for hydrogen sulfide. No hydrogen sulfide was detected over a period of two months following the addition of the aminal reaction product.

Example 3

Table 1 summarizes the results from additional examples where the efficiency of the aminal with three different corrosion inhibitor batches of O,O-disubstituted dithiophosphoric acid and pyrophosphates in aromatic 100 solvent was measured. The first two sets measured the amount of $H_2S$ levels for each sample within both sets after 2 months. The third set measured the amount of H2S levels for each sample within set 3 after 6 days. Sets 1 and 2 were left at ambient temperature during the two-month period, while the temperature for the samples within Set 3 was 40° C. The increased temperature within Set 3 may have accelerated the release of any $H_2S$ release remaining within the headspace. Although not shown in Table 1, there is no detectable $H_2S$ within the headspace for Set 3 after one month at 40° C. As noted from Table 1, an increased amount of aminal added to the head space decreases the amount of $H_2S$ within the headspace. In addition, increasing the temperature during the reaction and possibly after the reaction may decrease the amount of $H_2S$ within the headspace.

TABLE 1

Measurements of $H_2S$ Within the Headspace

| Sample | Temperature | Acid Number for Corrosion Inhibitor (mg KOH/g) | Amount of Corrosion Inhibitor (Wt. %) | Amount of Aminal (Wt. %) | Aromatic 100 Solvent (Wt. %) | Head Space $H_2S$, ppm |
|---|---|---|---|---|---|---|
| Set 1: Observation after 2 months ||||||| 
| 1A | Ambient | 42.58 | 53.5 | 0 | 46.5 | 17,000 |
| 1B | Ambient | 42.58 | 53.5 | 3.75 | 42.75 | 0.55 |
| 1C | Ambient | 42.58 | 53.5 | 7.5 | 39 | ND |
| Set 2: Observation after 2 months |||||||
| 2A | Ambient | 63.38 | 53.5 | 0 | 46.5 | 68,000 |
| 2B | Ambient | 63.38 | 53.5 | 7.5 | 39 | 0.1 |
| 2C | Ambient | 63.38 | 53.5 | 8.5 | 38 | ND |
| Set 3: Observation after 6 Days |||||||
| 3A | 40° C. | 44.78 | 53.5 | 0 | 46.5 | 23,000 |
| 3B | 40° C. | 44.78 | 53.5 | 3.75 | 42.75 | 0.1 |
| 3C | 40° C. | 44.78 | 53.5 | 5 | 41.5 | ND |

*ND (Not detected)

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, specific systems, phosphorous containing compounds, sulfur species, additives, and functional groups within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the treated system may consist of or consist essentially of a system, at least one phosphorous-containing compound, and at least one additive.

The method may consist of or consist essentially introducing an additive to a corrosion inhibitor within a system, wherein the corrosion inhibitor is a phosphorous-containing compound selected from the group consisting of O,O- disubstituted dithiophosphoric acid, pyrophosphates, and combinations thereof and wherein the additive is selected from a group consisting of an aminal, a dialkylamine, and combinations thereof; and the system is an aqueous system, an aerobic system, and/or an anaerobic system.

The words "comprising" and "comprises" as used throughout the claims, are to be interpreted to mean "including but not limited to" and "includes but not limited to", respectively.

What is claimed is:

1. A treated system comprising:
   a system containing fluid selected from the group consisting of an aqueous system, an aerobic system, an anaerobic system, and combinations thereof; and
   a corrosion inhibitor comprising (1) at least one phosphorous-containing compound selected from the group consisting of O,O-disubstituted dithiophosphoric acid, pyrophosphates, and combinations thereof and
   (2) at least one additive selected from the group consisting of an aminal, a dialkylamine, and combinations thereof;
   wherein the aminal has a formula of $(R1)(R2)N-CH_2-N(R3)(R4)$ where each of R1-R4 is an alkyl group, an aryl group, a substituted aryl group, and/or an alkylalkoxylate, and where R1, R2, R3, and R4 are the same or different.

2. The treated system of claim 1, wherein the amount of the additive present in the treated system ranges from about 1 wt % to about 15 wt % based on the total amount of fluid in the system.

3. The treated system of claim 1, wherein the corrosion inhibitor further comprises at least one sulfur species.

4. The treated system of claim 3, further comprising a first reaction product produced from a first reaction between the at least one additive and the at least one sulfur species.

5. The treated system of claim 4, further comprising a second reaction product produced from a second reaction between the first reaction product and the at least one phosphorous containing compound.

6. The treated system of claim 5, wherein the second reaction product is a stable reaction product.

7. A treated system comprising:
   a system selected from the group consisting of an aqueous system, an aerobic system, an anaerobic system, and combinations thereof; and
   a corrosion inhibitor comprising at least one sulfur species and at least one phosphorous-containing compound selected from the group consisting of O,O-disubstituted dithiophosphoric acid, pyrophosphates, and combinations thereof;
   at least one additive selected from the group consisting of an aminal, a dialkylamine, and combinations thereof, wherein the aminal has a formula of $(R1)(R2)N-CH_2-N(R3)(R4)$ where each of R1-R4 is an alkyl group, an aryl group, a substituted aryl group, and/or an alkylalkoxylate, and where R1, R2, R3, and R4 are the same or different; and
   at least one inactivated composition selected from the group consisting of at least one inactivated sulfur species, at least one inactivated phosphorous-containing compounds, and combinations thereof.

8. A method comprising:
   introducing at least one additive to a corrosion inhibitor comprising at least one phosphorous-containing compound selected from the group consisting of O,O-disubstituted dithiophosphoric acid, pyrophosphates, and combinations thereof; wherein the at least one phosphorous-containing compound exists within a system containing fluid selected from the group consisting of an aqueous system an aerobic system, an anaerobic system, and combinations thereof; wherein the at least one additive is selected from the group consisting of an aminal, a dialkylamine, and combinations thereof; wherein the aminal has a formula of $(R1)(R2)N-CH_2-N(R3)(R4)$ where each of R1-R4 is an alkyl group, an aryl group, a substituted aryl group, and/or an alkylalkoxylate, and where R1, R2, R3, and R4 are the same or different.

9. The method of claim 8, wherein the dialkylamine comprises an alkyl group that is a straight or branched chain having from 1 carbon to 5 carbons.

10. The method of claim 8, wherein the amount of the additive ranges from about 1 wt % to about 15 wt % based on the total amount of fluid in the system.

11. The method of claim 8, further comprising inactivating the at least one phosphorous-containing compound within the system to form at least one inactivated phosphorous-containing compound.

12. The method of claim 8, wherein the corrosion inhibitor further comprises at least one sulfur species.

13. The method of claim 12, further comprising reacting the at least one additive with the at least one sulfur species to form a first reaction product.

14. The method of claim 13, further comprising reacting the first reaction product with the at least one phosphorous-containing compound to form a second reaction product; and wherein the second reaction product is a stable reaction product.

15. A method comprising:
   circulating a corrosion inhibitor containing at least one additive, at least one sulfur species, and at least one phosphorous-containing compound selected from the group consisting of O,O-disubstituted dithiophosphoric acid, pyrophosphates, and combinations thereof within a system; wherein the system is selected from the group consisting of an aqueous system an aerobic system, an anaerobic system, and combinations thereof; wherein the at least one additive is selected from the group consisting of an aminal, a dialkylamine, and combinations thereof; and wherein the aminal has a formula of $(R1)(R2)N-CH_2-N(R3)(R4)$ where each of R1-R4 is an alkyl group, an aryl group, a substituted aryl group, and/or an alkylalkoxylate, and where R1, R2, R3, and R4 are the same or different; and
   inactivating the at least one phosphorous-containing compound, the at least one sulfur species, and combinations thereof with the at least one additive.

* * * * *